United States Patent

[11] 3,628,112

[72] Inventor Thomas A. O. Gross
Concord Road, Lincoln, Mass. 01773
[21] Appl. No. 41,946
[22] Filed June 1, 1970
[45] Patented Dec. 14, 1971

[54] DYNAMIC BRAKING OF ELECTRIC MOTORS WITH LOAD CHANGING DURING BRAKING
11 Claims, 3 Drawing Figs.

[52] U.S. Cl. ................................................. 318/258,
318/261, 318/369, 318/380
[51] Int. Cl. .................................................. H02p 3/14
[50] Field of Search .......................................... 318/258,
261, 364, 369, 380, 430

[56] References Cited
UNITED STATES PATENTS

| | | | |
|---|---|---|---|
| 3,525,027 | 8/1970 | Weiser | 318/380 |
| 3,153,182 | 10/1964 | Choudhury | 318/380 |
| 3,249,841 | 5/1966 | Liebenthal | 318/380 |
| 3,466,524 | 9/1969 | Cooper | 318/369 |

*Primary Examiner*—Benjamin Dobeck
*Assistant Examiner*—K. L. Crosson
*Attorney*—William D. Roberson

ABSTRACT: A motor system for energizing and deenergizing an electric motor and for dynamically braking the motor to a halt after deenergization. When the motor is turned off, a dynamic braking circuit is connected in series with the motor windings to assure generator action and to provide for dissipation of the kinetic energy of the motor in the form of heat. A current-limiting resistor in the braking circuit absorbs much of the energy immediately upon the initiation of braking. An electronic control circuit responds to the integral of the energy absorbed in the braking circuit. When the absorbed energy has reached a predetermined proportion of the total kinetic energy of the motor to be dissipated, the control circuit causes the current-limiting resistor to be short-circuited, thereby to permit larger currents to flow in the braking circuit, bringing the motor quickly to a halt.

Patented Dec. 14, 1971

3,628,112

INVENTOR.
THOMAS A.O. GROSS
BY
William D. Roberson
ATTORNEY

DYNAMIC BRAKING OF ELECTRIC MOTORS WITH LOAD CHANGING DURING BRAKING

BACKGROUND OF THE INVENTION

A familiar technique for rapid stopping of electric motors involves the connection of the motor windings with a switch in such a way that, after disconnection of the motor from its source of power, the motor is caused to generate electrical power, the generated power being dissipated in resistance within the motor circuit. For example, a series-connected universal motor operating from an AC source can be made to generate DC by disconnecting the motor from the source and by shorting an inverted field winding across the armature winding. If the motor is sufficiently large to meet a critical efficiency requirement and if the circuit is not interrupted during the portions of the current cycle when the magnetic flux passes through zero, the conditions for generation are satisfied and the inertial energy stored in the motor rotor and the load are rapidly dissipated by ohmic losses of the generated electric power. The armature brakes to a halt.

Surge currents created on the initiation of the braking or generating mode can frequently be as high as an order of magnitude larger than the running current in the motor mode. High surge currents can cause severe brush erosion and may tend to produce undesireable braking jolts. The obvious way to reduce surge currents is to introduce resistance into the braking circuit. However, if sufficient resistance is added to the circuit in the generator mode to reduce the generated surge current to a level approaching that of the running current, the period required to bring the motor to a halt is greatly lengthened. For the improvement of braking efficiency in some motor braking circuits, extraordinary steps have been taken to reduce circuit resistance, as by the use of motor brushes of especially low resistance. This, however, encourages commutator arcing and fouling, and ultimately promotes that high-resistance brush-commutator condition which decreases braking efficiency and can lead to the complete failure of dynamic braking.

The consequences of a braking system failure can be very serious. For example, one important application of dynamic braking systems for electric motors is in connection with power-operated hand tools. It is a definite safety feature for a power-operated hand tool to be brought to a sudden stop after it is turned off. Some, but unfortunately not many, power-operated hand saws are equipped with dynamic braking circuits. A powerful hand saw with its blade still coasting after deenergization of the saw motor can be a dangerous instrumentality. Desirably, after the saw motor is turned off, the blade should halt within a very few seconds. A user of such a saw, relying on its braking characteristics, may find in that statistical number of cases when the braking system fails, that the still-coasting saw blade is more dangerous to him personally than it would have been if the motor had not been equipped with a brake. Reliability of the braking circuit is therefore most important.

BRIEF SUMMARY OF THE INVENTION

The invention is not limited to the use of universal motors. However, in the practice of a preferred embodiment of this invention a dynamic braking system is provided for a universal electric motor in which system a comparatively small capacitor stores a charge during periods of motor energization. The energy stored on the capacitor is not in itself sufficient to provide or to absorb sufficient braking current to bring the motor quickly to a halt after deenergization. The energy stored by the capacitor and delivered by it to the motor windings after deenergization is, however, sufficient to assure that adequate magnetic flux is present after deenergization to place the motor in a generative mode. Immediately thereupon, the considerable braking currents generated in the motor windings are delivered through a diode circuit in shunt to the capacitor. Effective braking is initiated by the capacitor and sustained by the diode shunt circuit. This much of the embodiment is described and claimed in my copending U.S. Pat. application, Ser. No. 799,656, filed Feb. 17, 1969, now U.S. Pat. No. 2,548,276, issued Dec. 15, 1970.

In motor-braking systems constructed in accordance with the present invention, an energy dissipating and current-limiting resistor is incorporated within the braking circuit. The value of such a resistor is a compromise between two important and competing factors. To reduce the braking interval as much as possible would require a very low value of resistance to encourage high-braking currents. But to minimize arcing between the commutator and the brushes a higher value is indicated. An ideal load for such a system would develop a constant current in the braking circuit. As a first approximation of a constant current braking system, this invention initiates braking with a given value of arc-limiting resistance in the braking circuit. After a significant predetermined part of the motor's kinetic energy has been dissipated, and the braking current has declined, the system shorts out the resistance to increase the braking current and bring the motor very quickly to a reliable halt. The entire energy-responsive system, described more fully hereinafter and claimed in the appended claims, is relatively compact, inexpensive and readily adaptable to almost any motor-driven hand tool, stationary or portable. Arcing at the motor brushes is substantially minimized with consequent advantages to the life of the motor system and the reliability of its braking performance.

INTRODUCTION TO THE DRAWINGS

Further details of the invention as well as additional advantages of its use may be more readily comprehended with reference to the following detailed description taken together with the accompanying drawings wherein.

DETAILED DESCRIPTION

Figure 1:
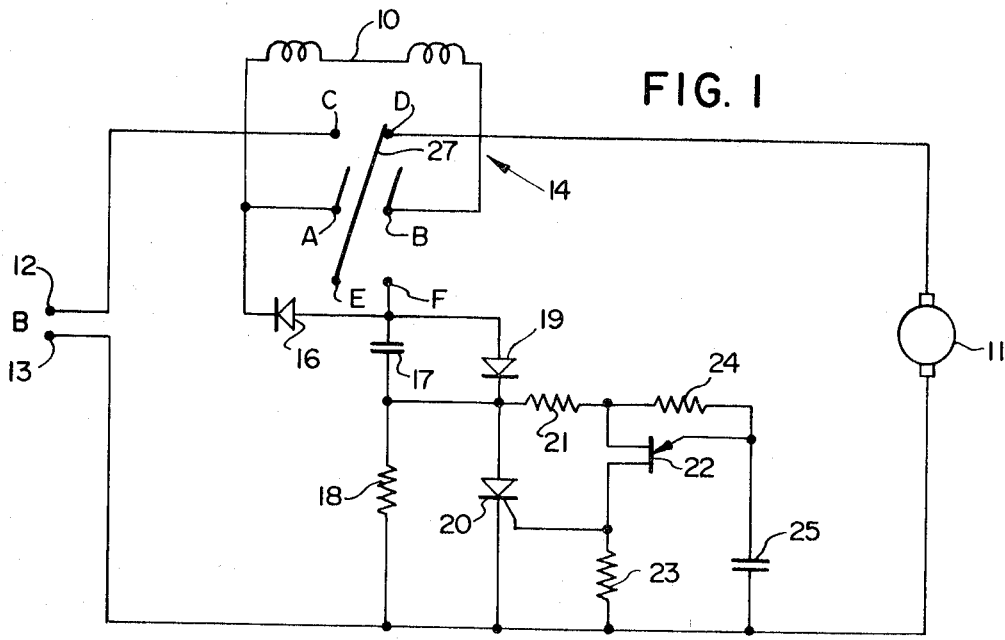
FIG. 1 is a circuit diagram of an improved and preferred motor-control system constructed in accordance with this invention with electronic control of the braking load.

The motor control system represented in FIG. 1 comprises a series-connected universal motor having a stator winding 10 and a commutated rotor winding 11. The motor is preferably of that type known as a universal motor, which may be powered either by AC or by DC and which is capable of generating DC with appropriate connection of the windings when the rotor or armature is driven by an external source of power or by its own inertia. The motor windings are connectable in series across a source of alternating current represented by terminals 12 and 13 by means of a double-pole double-throw switch 14. The motor is energized and running when the movable contacts A and B of switch 14 are switched to the upper position contacting fixed contacts C and D respectively. Under these conditions a continuous series circuit can be traced through terminal 12, contacts C and A of switch 14, field or stator winding 10, rotor winding 11, and terminal 13.

When the motor is thus energized, a control circuit is also connected across terminals 12 and 13. In this embodiment of the invention the control circuit comprises, in immediate series circuit, a unilaterally conductive device such as diode or rectifier 16, an energy storage device represented by capacitor 17 and a current-limiting load resistor 18. A shunt circuit across capacitor 17 includes another unilaterally conductive device shown as diode 19. Diode 19 is poled in opposition to the polarity of diode 16. This part of the control circuit is connected in series from terminal A of switch 14 to that side of the line connected to terminal 13.

Connected across the current-limiting resistor 18 is a silicon controlled rectifier (SCR) 20 with an associated control circuit. As will be described more fully below, the function of the control circuit is to control the current in the braking circuit during the short braking interval by limiting the initial potentially damaging surge of braking currents and thereafter, in response to the dissipation of a predetermined amount of energy in the braking system, increasing the level of currents permitted to flow. The system combines authority in stopping with very low brush wear on the motor.

A bridge circuit consisting, in this example, of a resistor 21, unijunction transistor (UJT) 22 and resistor 23 is connected across the SCR 20 with the control electrode of the SCR 20 coupled to the connection between the UJT 22 and the resistor 23. The emitter of UJT 22 is connected to the junction between resistor 24 and capacitor 25. The resistors 21 and 24 with capacitor 25 constitute in part an integrating circuit connected across the current-limiting resistor 18 and responsive to the sum of the electrical currents through the current-limiting load resistor. The integrating circuit thus responds to the cumulative energy dissipated in the load resistor 18.

In controlling a universal motor of 1.5 horsepower energized at 115 volts, 60 hertz and drawing a nominal load current of 13 amperes, the following circuit components have been found appropriate:
Capacitor 17 — 10 mf., 150 v. electrolytic
Capacitor 25 — 6 mf., 25 v.
Diode 16 — 1N4004
Diode 19 — 1N5402
Resistor 18 — 5 ohms, 10 watts
Resistor 21 — 33 K., one-half watt
Resistor 23 — 47 ohms, one-half watt
Resistor 24 — 50 K., to 150 K., one-fourth watt
SCR 20 — 2N4441 or C15F
UJT 22 — 2N4870, or 2N4871, or MU4891-3

When the motor is switched on initially with the movable contacts A and B of switch 14 in their upper or ON position, capacitor 17 is charged by the unidirectional current through diode 16. The current-limiting resistor 18 limits the initial peak-charging current to about 10 amperes with the circuit values given. The potential across the capacitor 17 reaches its full value of approximately 150 volts in less than a full cycle of the AC supply. Diode 19 is essentially inactive during the entire time that the motor is energized from the source, being reverse biased by the potential on capacitor 17.

When the switch 14 is switched to the OFF position with the movable contacts A and B connected to stationary contacts E and F respectively, the motor operates in a generator mode for dynamic braking. Because of the cross connection between contacts D and E, the stationary winding 10 is connected in phase reversed relationship and in series with the rotor winding 11, and with portions of the control circuit. When this happens the potential across the capacitor 17 causes an increase in current through the motor windings. This current is initially determined by the potential on the capacitor 17 and the field inductance of the motor windings. In the example given, less than one millisecond is required for generation to occur. A generated surge current is produced which flows through the capacitor 17 and current-limiting resistor 18 until diode 19 is forward biased. Thereafter diode 19 becomes conductive and practically all of the generated surge current flows through diode 19, bypassing the capacitor 17. The energy stored in the capacitor 17 can be very small relative to the stored mechanical energy in the system.

The magnitude of the surge current generated immediately upon switching the motor to its generator mode for dynamic braking is, of course, limited by the impedance in the dynamic braking circuit, in this case load resistor 18. The value of the dynamic braking resistor is a compromise between a desire to minimize brush-commutator arcing and the need to bring certain types of motors to a prompt halt. As soon as the generator or braking mode is initiated the brush current tends to become very high with a concommitant high-stopping torque. When the motor speed drops to just below one-third speed, 90 percent of its mechanical energy has been dissipated, but because the current then has a relatively low value the motor continues to rotate for a considerable period. In wound field-motors the time required to reach a halt from 30 percent speed is generally greater than the time to reach 30 percent speed from 100 percent. Permanent magnet field motor have relatively greater slow speed stopping torque, but this invention will be seen to be equally valuable to both wound-field and permanent magnet motors.

A constant current braking resistor is an ideal load for power tool brakes because the stopping torque is constant and the brush/commutator damage is minimized for a given stopping time. The circuit of FIG. 1 approximates a constant current load by shorting out a comparatively large current-limiting load impedance after most of the motor energy has been dissipated in the load. The effects of this will be seen in greater particularity in connection with FIG. 2 which graphically illustrates the dynamic-braking current waveform of FIG. 1.

Immediately upon initiation of the generator mode a substantial potential develops across the current-limiting resistor 18. SCR 20 at this time is nonconducting, but is later switched on to bypass resistor 18. The instant at which the SCR 20 is turned on is determined in part by the RC circuit comprising resistors 21 and 24 and capacitor 25. This RC circuit in turn is responsive to the time integral of generator currents through resistor 18. When the potential on capacitor 25 reaches a predetermined level after about one half second, the UJT 22 fires. The capacitor 25 thereupon discharges into resistor 23 and SCR 20, triggering the latter. As a result, subsequent generator currents, bypassing resistor 18, are permitted to increase and bring the motor more quickly to a halt.

Figure 2:
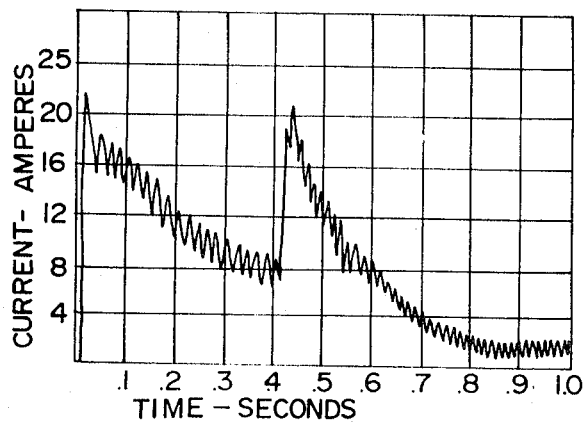
FIG. 2 is a graph showing the currents in the windings of the motor shown in FIG. 1 during the brief braking phase.

The effects of the control circuitry will be seen with greater particularity in FIG. 2 which graphically illustrates the dynamic-braking current waveform of the system shown in FIG. 1. Here is can be seen that immediately after time zero, when the motor is switched off, the generator surge current rises abruptly to about 20 amperes. The current then declines as some of the energy of the coasting motor is dissipated. In less than half a second, the generated current again surges when the current-limiting resistor is bypassed. In a total interval of less than a second the motor is stopped, while surge currents are kept well under control. Without a current-limiting resistance in the circuit the surge current would peak much higher; without the triggered SCR circuit the motor would take several seconds or more to come to a complete stop.

Certain variations in the circuit of FIG. 1 may be effected within the scope of this invention. A unijunction transistor trigger is shown because the firing time is relatively independent of the voltage presented to the UJT. The firing time is thus unaffected by changes in commutator condition, by changes in inertial loads on the motor, or even by changes in the motor itself. The SCR could, however, be driven directly from capacitor 25 without an UJT, but a much larger value of capacitance would be required. Other trigger devices could be used in place of the UJT. For example, a silicon unilateral switch or a four-layer diode, selected to trigger at a given potential, could be connected from capacitor 25 to the gate electrode of the SCR 20.

In any such circuits the SCR does not function to short circuit the resistor until the major portion of the rotor's mechanical energy has been spent. This plus the short duty cycle of the SCR permits modest and economical ratings to be adopted.

Figure 3:
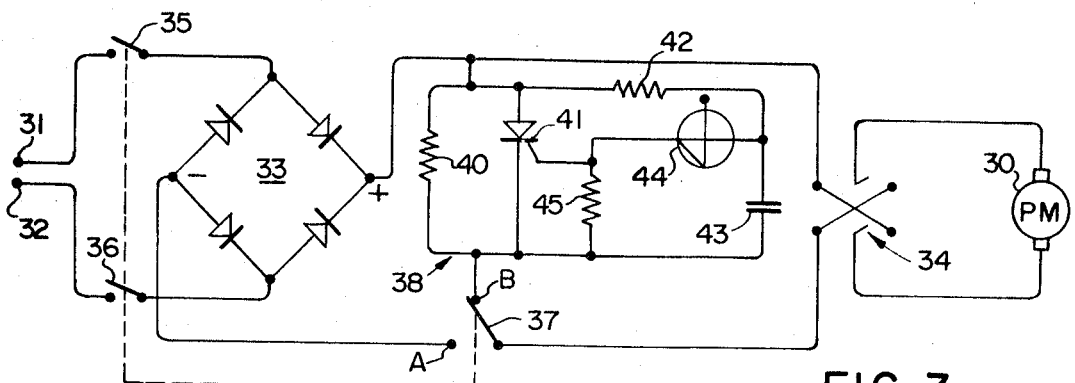
FIG. 3 is a circuit diagram illustrating an embodiment of the invention for dynamically braking a permanent magnet motor.

In FIG. 3 is shown an embodiment of the invention in a circuit for the control of a permanent magnet (PM) motor 30. When running, the motor derives its power from AC line terminals 31 and 32 and full-wave rectifier 33. DC is supplied through reversing switch 34. When supply switches 35 and 36 are opened, the braking switch 37 is switched from terminal A to terminal B to connect the braking circuit 38 in series with the PM motor. The braking circuit includes a current-limiting resistor 40 across which is connected SCR 41, and on RC circuit comprising resistor 42 and capacitor 43. Across the capacitor 43 is connected a silicon unilateral switch (SUS) 44 and resistor 45, and the SUS is also connected to the gate electrode of the SCR. An SUS is a silicon planar, monolithic integrated circuit having thyristor electrical characteristics closely approximating those of an ideal four-layer diode. It switches at relatively low voltages of about 8 volts.

The circuit performs in a manner similar to the one shown in FIG. 1. That is, the initial braking currents flow through resistor 40, because the SCR is then nonconducting. The RC circuit combination integrates the potential across resistor 40 due to the current therein, building up a charge on capacitor 43. When the trigger potential across SUS 44 is reached, the resulting impulse triggers the SCR 41 to short out the resistor 40. A braking current waveform like that in FIG. 2 results. In a permanent magnet motor control circuit, such a braking circuit should be placed on the opposite side of the reversing switch from the motor.

These and other variations of the invention are intended to be encompassed by the appended claims.

I claim:

1. A dynamically braked motor system comprising:
   an electric motor operable both in a motor mode and in a generator mode;
   supply terminals connectable to a source of electrical power;
   switching means for controlling the connection of said motor to said supply terminals;
   means made operative upon disconnection of said motor from said supply terminals for completing a dynamic-braking circuit with said motor through a current-limiting impedance;
   energy-responsive means for generating a time-varying signal representing the cumulative amount of energy dissipated in said dynamic-braking circuit; and
   means responsive to the attainment by said signal of a predetermined value for automatically reducing the value of the impedance in said dynamic-braking circuit after a predetermined quantity of energy has been dissipated therein.

2. A control system for energizing and for dynamically braking an electric motor operable both in a motor mode and in a generator mode comprising:
   supply terminals connectable to a source of electrical power;
   switching means for controlling the connection of such a motor to said supply terminals;
   means made operative upon disconnection of such motor from said supply terminals, for completing a dynamic-braking circuit with such motor through a current-limiting impedance;
   energy-responsive means for generating a time-varying signal representing the cumulative amount of energy dissipated in said dynamic-braking circuit; and
   means responsive to the attainment by said signal of a predetermined value for automatically reducing the value of the impedance in said dynamic braking circuit after a predetermined quantity of energy has been dissipated therein.

3. A control system for energizing and for dynamically braking an electric motor which is capable of generating electrical currents, said system comprising:
   supply terminals connectable to a source of current;
   switching means for controlling the connection of such a motor to said supply terminals;
   current-limiting impedance means;
   means made operative upon disconnection of such motor from said supply terminals for completing a dynamic-braking circuit through such motor and said impedance means; and
   load-reducing means responsive to the dissipation of a predetermined quantity of energy by said braking circuit for reducing the value of the impedance means in said braking circuit, thereby to reduce the total braking interval.

4. The control system of claim 3 wherein said load reducing means is responsive to the time integral of dynamic-braking currents in said current-limiting impedance means.

5. The control system of claim 3 wherein said current-limiting impedance means is primarily resistive.

6. The control system of claim 5 wherein said load reducing means comprises:
   an integrating circuit connected across said current-limiting impedance means to derive an electrical signal representing the time integral of braking currents in said braking circuit; and
   second switching means responsive to the attainment by said electrical signal of a predetermined value for completing a shunt circuit around said current-limiting impedance means.

7. The control system of claim 6 wherein said second switching means comprises at least one solid state switching device switchable between a high-resistance condition and a low-resistance shunt condition in response to said electrical signal.

8. The control system of claim 7 wherein said solid-state-switching device is a silicon controlled rectifier.

9. The control system of claim 3 further comprising a universal motor having stator and rotor windings, and wherein said switching means is operable in an energizing mode to connect the windings of said universal motor in series with each other and with said supply terminals, and in a deenergizing mode to disconnect said windings from said supply terminals and connect them in inverted series relationship with said braking circuit.

10. The control system of claim 9 wherein said braking circuit includes electrical energy storage means, unilaterally conductive means for delivering electrical energy to said storage means from said supply terminals when said switching means is in its energizing mode, means for discharging said storage means into the windings of such motor when said switching means is switched to its deenergizing mode thereby to assure generative coupling between the windings of such motor, and unilaterally conductive shunt circuit means connected in parallel to said energy storage means to permit currents generated in the windings of such motor to continue to flow after the energy stored in said storage means is exhausted.

11. The control system of claim 3 further comprising a direct current motor, a reversing switch to control the direction of rotation of said motor, and wherein said switching means is operable in an energizing mode to connect the windings of said motor to a source of direct current potential through said reversing switch and in a deenergizing mode to disconnect said windings from said source and connect them in series with said braking circuit through said reversing switch.

* * * * *